May 22, 1951        F. C. McNICOL        2,553,667
SUPPORTING PANEL FOR GROUPS OF ELECTRICAL DEVICES
Filed March 15, 1948        2 Sheets-Sheet 1
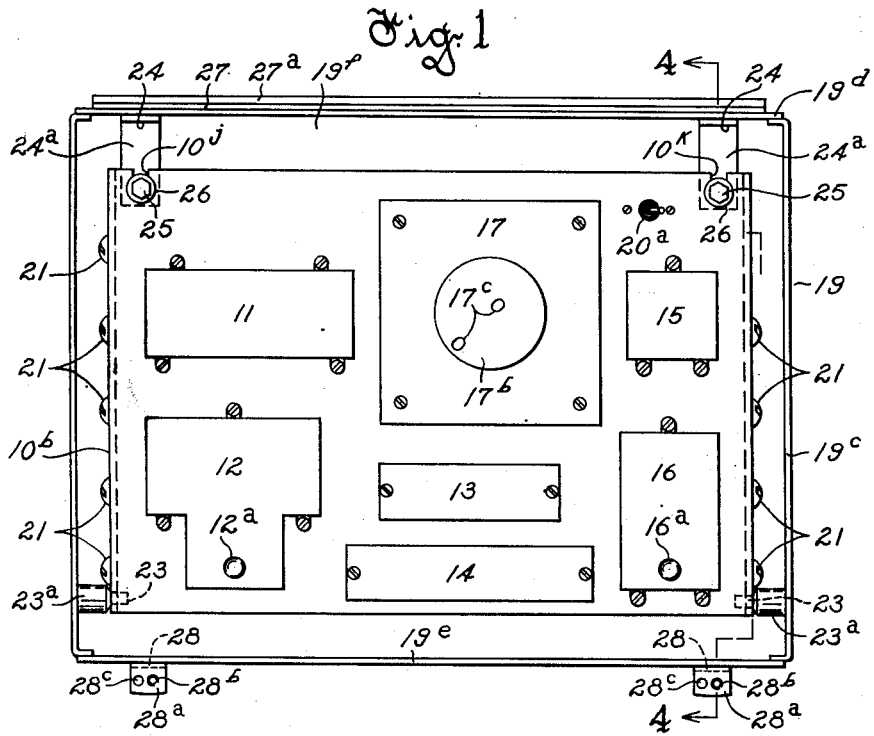
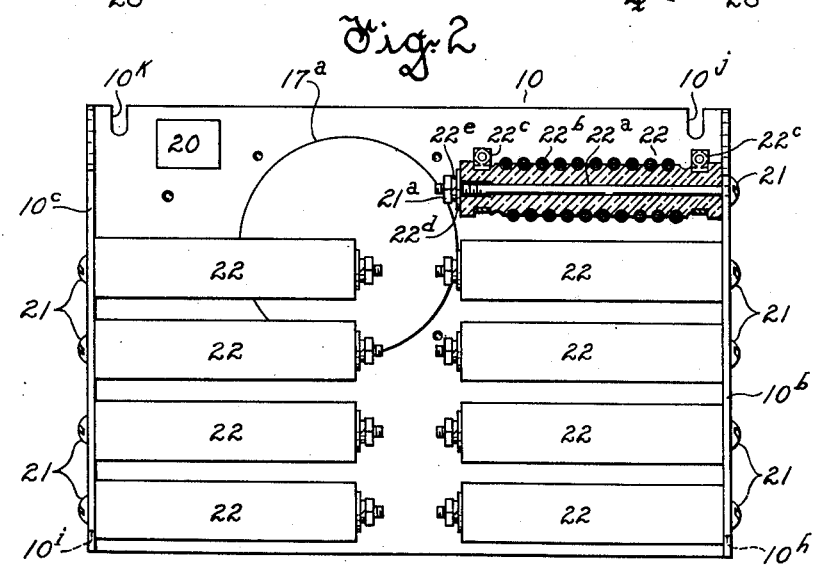
Inventor
Forrest C. McNicol
By Frank H. Hubbard
Attorney May 22, 1951     F. C. McNICOL     2,553,667
SUPPORTING PANEL FOR GROUPS OF ELECTRICAL DEVICES
Filed March 15, 1948     2 Sheets-Sheet 2
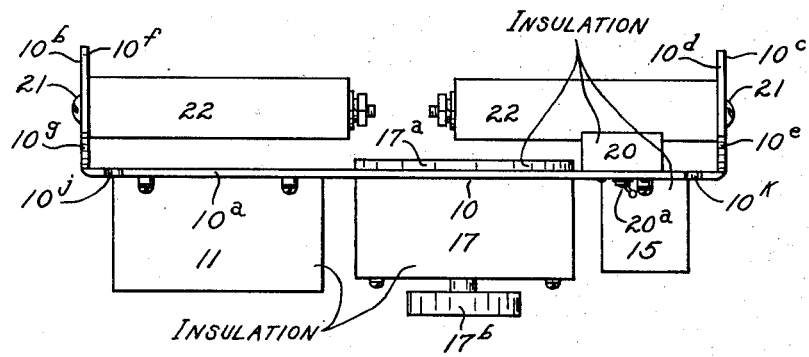
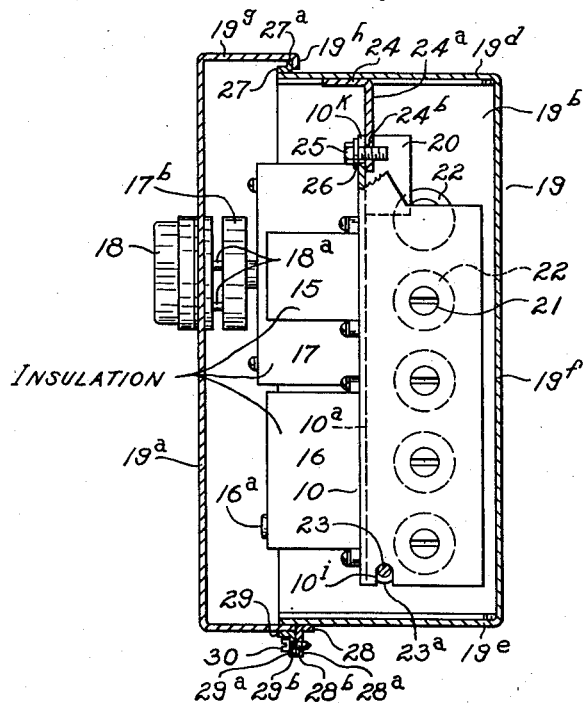

Patented May 22, 1951

2,553,667

UNITED STATES PATENT OFFICE 2,553,667

SUPPORTING PANEL FOR GROUPS OF ELECTRICAL DEVICES

Forrest C. McNicol, Milwaukee, Wis., assignor to Cutler-Hammer, Inc., Milwaukee, Wis., a corporation of Delaware Application March 15, 1948, Serial No. 14,888

5 Claims. (Cl. 175—307)

This invention relates to improvements in supporting panels for groups of electrical devices. The invention also relates to an improved form of housing for supporting and enclosing such panels.

An object of the invention is to reduce the weight and cost of such supporting panels and to avoid the necessity for attachment of auxiliary brackets for support of additional electrical devices to be positioned at the rear of such panels.

Another and more specific object is to provide a one-piece sheet metal panel consisting of a substantially rectangular main body portion and a pair of wings formed integrally with said main body portion and extending rearwardly therefrom at substantially right angles thereto.

Another object is to provide such a panel having suitable openings formed in the main body portion to provide for attachment of a multiplicity of dead-backed electrical units to the front face thereof, and having suitable openings in the wings to provide for attachment of additional electrical units to the inner faces of the respective wings.

Another object is to provide a panel of the aforementioned character having alined bearing notches formed in the lower edges of the respective wings, whereby pivotal support and outward tilting of the panel may be effected.

Another object is to provide such a panel having a plurality of notches in the upper edge of the main body portion thereof to facilitate rigid but removable attachment thereof to a housing or similar support by means of suitable screws or bolts.

Other objects and advantages of the invention will hereinafter appear.

The accompanying drawings illustrate an embodiment of the invention which will now be described, it being understood that the embodiment illustrated is susceptible of modification in respect of certain structural details thereof without departing from the scope of the appended claims.

In the drawings, Fig. 1 is a front elevational view (on a greatly reduced scale) of my improved sheet metal supporting panel for a multiplicity of related electrical units, said panel being shown in assembled position within a suitable housing, from which the housing cover has been removed.

Fig. 2 is a rear elevational view of the panel shown in Fig. 1, and illustrating the manner in which a multiplicity of resistor units may be attached to and supported by the respective integral wings behind the main body portion of the panel; one of the resistor units being shown in cross section.

Fig. 3 is a top plan view of the sheet metal supporting panel shown in Figs. 1 and 2, and illustrating (in conjunction with the other figures) the manner in which the multiplicity of dead-back electrical units may be rigidly and removably attached to the front face of the main body portion of the panel for support by the latter, and—

Fig. 4 is a sectional view, on the broken line 4—4 of Fig. 1, with all of the parts, including the cover member of the housing, in assembled position.

In the drawings, the numeral 10 designates a preferred form of sheet metal panel embodying my invention. In practice I prefer to punch from a flat steel plate a blank (not shown) of the required contour to provide a substantially rectangular main body portion $10^a$ and a pair of wings $10^b$ and $10^c$ of like contour bent backwardly, along substantially parallel lines at substantially right angles to said main body portion $10^a$. Either during punching of said blank, or as a separate punching, cutting or drilling operation, I provide the main body portion $10^a$ and the wings $10^b$ and $10^c$ with a multiplicity of holes or openings, most of which correspond in their respective positions with the holes or openings provided in the particular group of electrical units to be supported by the panel. More particularly, I prefer to provide in the main body portion $10^a$ a multiplicity of tapped openings for cooperation with the shanks of suitable securing screws of appropriate lengths to provide for removably securing the various electrical units 11, 12, 13, 14, 15, 16 and 17 to the front surface of said body portion. Although the units 11 to 17, inclusive, are herein illustrated more or less schematically, it is to be understood that the same, along with the resistors supported by wings $10^b$ and $10^c$, may comprise electrical units forming parts of a manual controller for an alternating current motor driving a printing press or the like. It is to be understood, of course, that the supporting panel (comprising main body portion $10^a$ and wings $10^b$ and $10^c$) may be provided with differently arranged openings for the securing screws, according to the particular character or shape of the electrical units employed.

In the particular combination of electrical units herein illustrated by way of example, it may be assumed that the units 11, 12, 15, and 16 are electromagnetic contactors of well known form, whereas the units 13 and 14 are terminal blocks to facilitate proper circuit connections for various elements of the controller. The unit 17 is a rotary type of commutator for controlling the energization of the electromagnetic contactors and for commutating the resistors supported by the aforementioned wings.

As shown in Fig. 2 the main body portion 10 of the panel is provided with a circular opening of a size to rather closely accommodate the circular portion 17a of unit 17; which portion 17a may have associated therewith groups of stationary contacts and contactors (not shown); the movement of the contactors being subject to control in accordance with the rotary position of the part 17b of unit 17. Part 17b is shown as provided with a plurality of recesses 17c (Fig. 1) which are adapted to accommodate the inner ends of a pair of studs 18a (Fig. 4) carried by a member 18 which is carried by and manually rotatable relatively to the cover member 19a, which is removably attachable to the main body member 19 of the supporting and enclosing housing for panel 10. The units 12 and 16 may each include a well known type of thermally responsive overload devices, the resetting pushbuttons of which are respectively designated by numerals 12a and 16a (see Figs. 1 and 4).

As shown in Figs. 2, 3 and 4 a suitable electric switch 20 may be attached to the rear surface of main body portion 10, by means of a pair of securing screws, as shown; said switch having a toggle lever 20a which is adapted in the right-hand position thereof shown in Figs. 1 and 3 to preselect circuit connections to afford low torque starting of the controlled printing press motor, and in its left-hand extreme position to preselect circuit connections for high torque starting of the controlled motor.

The wing 10b is provided with a group of five equally spaced openings to respectively accommodate the shanks of a corresponding number of relatively long bolts 21, and the wing 10c is provided with four of such openings which are preferably alined with the lower four openings in wing 10b; and a group of four bolts 21 are adapted to have their shanks inserted inwardly through the respective openings in wing 10c. The shank of each bolt 21 also penetrates a passage or opening 22a in a substantially cylindrical member 22 of molded porcelain or similar insulating material, as best illustrated at the upper right-hand end of Fig. 2. Each member 22 is provided with an external spiral groove to accommodate and support a helically wound resistance wire 22b, two clamping-ring type terminal members 22c being positioned in correspondingly shaped grooves adjacent opposite ends of the respective insulating members 22 for electrically connecting the respective ends of each coiled resistance wire 22b in circuit; and additional terminal members of known form may be attached to certain of said coiled resistance wires at a predetermined point or points between the ends thereof, according to the functions or control characteristics afforded by the particular electrical units of the complete control panel.

As shown in Fig. 2, one flat end of each insulator 22 is adapted to abut the inner surface of the wing 10b or 10c to which it is attached. A flat washer 22d and a lockwasher 22e are applied in sequence over the exposed threaded end of each bolt 21, and a nut 21a is then threaded onto the shank of each bolt 21 to secure the respective resistors in assembled position, as best illustrated in Figs. 2 and 3. The resistance units other than that shown in section in Fig. 2 are illustrated more or less diagrammatically and the otherwise exposed portions of the resistance wires may be assumed to have a coating or covering of a suitable vitreous insulating cement, if desired.

The aforementioned wings 10b and 10c might be of completely rectangular contour, and of a height corresponding to that of the main body portion 10a of the panel. In practice, however, I prefer that the initial sheet steel blank be of such form as to provide the upper ends of wings 10b and 10c with cut-away or removed portions, as indicated by the horizontal and angled lines 10d, 10e and 10f, 10g; thus reducing to some extent the weight and cost of the metal supporting panel without substantially affecting its strength and utility.

Wings 10b and 10c are provided in their respective lower edges, preferably quite closely adjacent the main body portion 10a of the panel, with bearing notches 10h and 10i of approximately inverted U-shape in contour (see Figs. 2 and 4), which bearing notches are axially alined with each other. The main body portion 10a of the supporting panel is provided with a plurality of notches, which are likewise preferably of somewhat elongated U-shape in contour; two of such notches, 10j and 10k being illustrated herein.

The aforementioned notches 10h and 10i are adapted to fit downwardly onto a pair of axially alined cylindrical pivot pins 23, 23 the enlarged base portions 23a, 23a of which are welded or otherwise rigidly and permanently attached to suitable supporting means. Such supporting means is herein shown as comprising the opposed side walls 19b and 19c of a box-like sheet metal member 19, which forms the main portion of the enclosing housing for the panel 10 and its associated parts; the aforementioned cover member 19a completing the enclosure. Housing member 19 is also provided with upper and lower end walls 19d and 19e and a rear wall 19f (Figs. 1 and 4).

A pair of inverted L-shaped metal brackets 24, 24 (Figs. 1 and 4) are welded or otherwise rigidly and permanently attached to the inner surface of the upper end wall 19d of member 19; the vertically depending arms of which brackets are so positioned that upon seating of bearing notches 10h and 10i upon pivot pins 23, 23 and contact of the rear surface of the main body portion 10a against the respective front surfaces of said depending arms 24a, 24a said main body portion 10a will be positioned in a plane parallel to the rear wall 19f of the housing member 19. This is to say, said main body portion 10a will be in the desired vertical position, assuming that housing member 19 is mounted in the usual manner. Each of said bracket arms 24a is provided with a tapped opening 24b (Fig. 4) aligned with the respective notches 10j, 10k to accommodate the threaded shank of a headed bolt 25; a flat washer 26 preferably being interposed between the head of each bolt 25 and the outer surface of said main body portion 10a of the panel.

As will be apparent to those skilled in the art the panel 10 and the electrical units carried thereby may be properly and completely wired with respect to each other before inserting the panel within and attaching the same to housing member 19 for support by the latter. Likewise it is obvious that by merely removing the bolts 25, 25 the panel, with the various units attached thereto, may be tilted forwardly to facilitate inspection of the units and the wiring thereof; whereas, if desired the panel 10 with the units attached thereto may be removed bodily from housing member 19 for inspection or replacement of any of the parts.

The aforementioned cover member 19ª is adapted to fit telescopically onto housing member 19 (see Fig. 4). To facilitate assembly of cover 19ª with respect to member 19, I prefer to weld or otherwise rigidly attach to the outer surface of the upper end wall 19ᵈ a metal member 27 of angle form in transverse cross section whereby an upstanding flange or hook-lug 27ª is provided (Figs. 1 and 4). The upper end wall 19ᵍ (Fig. 4) of cover member 19ª has its outer, or free, end bent downwardly at substantially a right angle thereto to provide a flange or lug 19ʰ which may be positioned behind the lug 27ª aforementioned. The cover member 19ª may then be allowed to move into a vertical position, in which position the side walls and the lower end wall will telescope over the corresponding walls of member 19. In order to limit the degree of telescoping movement of cover member 19ª I prefer to weld or otherwise rigidly attach to member 19 a pair of suitably spaced metal brackets 28, 28, the outwardly projecting arms 28ª of which are each provided with a tapped opening 28ᵇ of relatively small diameter and an opening 28ᶜ of somewhat larger diameter. The cover member 19ª has welded or otherwise rigidly attached to the outer surface of its lower end wall a pair of brackets, one of which is shown at 29 in Fig. 4. The outwardly projecting arm 29ª of each bracket 29 is provided with a tapped opening 29ᵇ within which a special known form of bolt 30 may have its forward threaded end portion inserted until the unthreaded portion of reduced diameter is substantially entirely within the tapped opening 29ᵇ, thus retaining bolt 30 against accidental removal from bracket arm 29ª. Each arm 29ª is also provided with a relatively larger opening (not shown) to be respectively alined with openings 28ᶜ in the respective bracket arms 28ª. Thus, as shown in Fig. 4, the bolts 30 may be threaded into the aforementioned tapped openings 28ᵇ to retain cover 19ª in assembled relationship to member 19. Alternatively the larger openings in the cooperating pairs of bracket arms may have the hasps of padlocks of suitable size inserted therein and locked, to positively prevent unauthorized removal of the cover member 19ª.

In assembling cover member 19ª to member 19 care must be exercised to insure that members 18 and 17ᵇ are in the same relative rotary positions to provide for interlocking engagement of pins 18ª (Fig. 4) with the recesses 17ᶜ (Fig. 1).

As aforeindicated I have herein disclosed one specific embodiment of my invention, by way of example; it being understood that various modifications in the functional characteristics of the electrical units employed may be effected. Thus although I have illustrated the use of the bent back panel wings for attachment and support of resistor units, it will be apparent to those skilled in the art that other types of electrical units, such as a control transformer or other electrical devices, might be attached to and supported by the wing or wings of the panel; it being only necessary to insure proper location of the openings for the screws or other fastening means on any portion of the supporting panel.

I claim:

1. In combination, a box-like sheet metal housing having a rear wall, parallel side walls, upper and lower end walls and an open front, said side walls having alined pivot pins rigidly attached thereto adjacent the lower ends thereof, a sheet metal supporting panel comprising a flat main body portion and a pair of wings formed integrally therewith and bent rearwardly at substantially right angles thereto, said wings having alined downwardly opening bearing notches formed in the lower edges thereof for cooperation with said pivot pins, the main body portion of said panel having notches formed therein and opening to the upper edge thereof for cooperation with suitable fastening means for removably retaining said panel in a fixed position within said housing, a multiplicity of electrical units of the dead-back type removably attached to the front surface of said main body portion, a multiplicity of rod-like metal members extending inwardly through the respective wings, a corresponding number of insulating members slidable onto said rod-like metal members and clamped to the latter and to the respective wings for support thereby, a resistor or resistors attached to and supported by each of the respective insulating members, a box-like sheet metal cover member the open end of which is adapted to telescope onto said housing member for complete enclosure of said panel, and means affording a readily engageable and disengageable hook connection between the respective upper ends of said housing and cover members.

2. In combination, a box-like sheet metal housing having a rear wall, parallel side walls, upper and lower end walls, and an open front, said side walls having alined pivot pins rigidly attached thereto adjacent the lower ends thereof, a sheet steel supporting panel comprising a flat main body portion and a pair of integral wings bent rearwardly at substantially right angles thereto, said wings having alined downwardly opening bearing notches formed in the lower edges thereof for cooperation with said pivot pins, the main body portion of said panel having notches formed therein and opening to the upper edge thereof for cooperation with suitable fastening means for removably retaining said panel in a fixed position within said housing, a multiplicity of electrical units of the dead-back type removably attached to the front surface of said main body portion, a multiplicity of rod-like metal members extending inwardly through the respective wings, a corresponding number of insulating members slidable onto said rod-like metal members and clamped to the latter and to the respective wings for support thereby, a resistor or resistors attached to and supported by each of the respective insulating members, a box-like sheet metal cover member the open end of which is adapted to telescope onto said housing member for complete enclosure of said panel, means affording a readily engageable and disengageable hook connection between the respective upper ends of said housing and cover members, and means comprising cooperating lugs on said housing and cover members to limit the degree of telescopic engagement thereof, each lug having a pair of openings one of which is adapted to accommodate a securing screw and the other of which is adapted to accommodate a padlock hasp.

3. In combination, an electrical control panel comprising a sheet metal plate having a substantially rectangular main body portion and a pair of wings integral with and extending rearwardly from said main body portion at substantially right angles to the latter, said main body portion and said wings each having a multiplicity of openings formed therein, a multiplicity of related electrical units attached to the front surface of said main body portion and to the inner surfaces of the respective wings through the medium of fastening elements penetrating said openings, said main body portion having a plurality of notches formed in the upper edge thereof, each of said wings having a bearing notch formed in the lower edge thereof, said bearing notches being axially alined with each other, a box-like sheet metal housing member having a pair of pivot pins attached to and extending inwardly from the respective side walls thereof for cooperation with said bearing notches to provide for forward tilting of said panel, a plurality of brackets rigidly attached to said housing member and overlapping the first mentioned notches at the rear face of said main body portion, and a corresponding number of removable fastening members penetrating said last mentioned notches and said brackets to provide for retention of said panel in a given position relatively to said housing member.

4. In a combination, an electrical control panel comprising a sheet metal plate having a substantially rectangular main body portion and a pair of wings integral with and extending rearwardly from said main body portion at substantially right angles to the latter, said main body portion and said wings each having a multiplicity of openings formed therein, a multiplicity of related electrical units attached to the front surface of said main body portion and to the inner surfaces of the respective wings through the medium of fastening elements penetrating said openings, said main body portion having a plurality of notches formed in the upper edge thereof, each of said wings having a bearing notch formed in the lower edge thereof, said bearing notches being axially alined with each other, a box-like sheet metal housing member having a pair of pivot pins attached to and extending inwardly from the respective side walls thereof for cooperation with said bearing notches to provide for forward tilting of said panel, a plurality of brackets rigidly attached to said housing member and overlapping the first mentioned notches at the rear face of said main body portion, a corresponding number of removable fastening members penetrating said last mentioned notches and said brackets to provide for retention of said panel in a given position relatively to said housing member, a box-like sheet metal cover member the upper end wall of which has a hooked engagement with the upper end wall of said housing member, and a plurality of pairs of bracket members respectively attached to the lower end walls of said housing and cover members to limit the closing movement of said cover member, each of said pairs of brackets being formed to accommodate alternative types of fastening and locking members.

5. In combination, an electrical control panel comprising a sheet metal plate having a substantially rectangular main body portion and a pair of wings integral with and extending rearwardly from said main body portion at substantially right angles to the latter, said main body portion and said wings each having a multiplicity of openings formed therein, a multiplicity of related electrical units attached to the front surface of said main body portion and to the inner surfaces of the respective wings through the medium of fastening elements penetrating said openings, said main body portion having a plurality of notches formed in the upper edge thereof, each of said wings having a bearing notch formed in the lower edge thereof, said bearing notches being axially alined with each other, a box-like sheet metal housing member having a pair of pivot pins attached to and extending inwardly from the respective side walls thereof for cooperation with said bearing notches to provide for forward tilting of said panel, a plurality of brackets rigidly attached to said housing member and overlapping the first mentioned notches at the rear face of said main body portion, a corresponding number of removable fastening members penetrating said last mentioned notches and said brackets to provide for retention of said panel in a given position relatively to said housing member, a box-like sheet metal cover member the upper end wall of which has a hooked engagement with the upper end wall of said housing member, a plurality of pairs of bracket members respectively attached to the lower end walls of said housing and cover members to limit the closing movement of said cover member, each of said pairs of brackets being formed to accommodate alternative types of fastening and locking members, certain of said electrical units being of the electromagnetically operable type, another of said electrical units including a member rotatable to commutate the circuits to be controlled by certain or all of said units jointly, and manually operable means rotatably supported by said cover member and accessible exteriorly of the latter, said last mentioned means having a removable interlocking driving connection with the rotatable member aforementioned.

FORREST C. McNICOL.

REFERENCES CITED

The following references are of record in the file of this patent:

UNITED STATES PATENTS

| Number | Name | Date |
|---|---|---|
| 1,228,362 | Hayes | May 29, 1917 |
| 2,128,647 | Johansson | Aug. 30, 1938 |
| 2,132,630 | Jackson | Oct. 11, 1938 |
| 2,178,220 | Blancha | Oct. 31, 1939 |
| 2,223,539 | Baker | Dec. 3, 1940 |
| 2,241,181 | Bushnell | May 6, 1941 |
| 2,304,923 | Jackson | Dec. 15, 1942 |
| 2,343,178 | Frank | Feb. 29, 1944 |
| 2,344,441 | Lorenz | Mar. 14, 1944 |